United States Patent [19]

Nakaki et al.

[11] Patent Number: 5,085,723
[45] Date of Patent: Feb. 4, 1992

[54] PROCESS AND APPARATUS FOR PRODUCING MAGNETIC DISKETTE

[75] Inventors: Masao Nakaki, Mito; Susumu Aoyama, Hitachi, both of Japan

[73] Assignee: Hitachi Setsubi Engineering Co., Ltd., Hitachi, Japan

[21] Appl. No.: 557,701

[22] Filed: Jul. 25, 1990

[30] Foreign Application Priority Data

Jul. 31, 1989 [JP] Japan .................. 1-198696

[51] Int. Cl.⁵ .................................. B32B 31/00
[52] U.S. Cl. ......................... 156/250; 156/256; 156/517; 156/556; 360/133
[58] Field of Search ............ 156/250, 252, 256, 517, 156/521, DIG. 36, 263, 277, 267, 556; 360/133

[56] References Cited

U.S. PATENT DOCUMENTS 4,946,530 8/1990 Lam .................. 156/256
4,960,480 10/1990 Iwamoto ............ 156/256

FOREIGN PATENT DOCUMENTS 152696 7/1987 Japan .

*Primary Examiner*—David A. Simmons
*Assistant Examiner*—Robert Barker
*Attorney, Agent, or Firm*—Antonelli, Terry, Stout & Kraus

[57] ABSTRACT

A process of producing a magnetic diskette comprises the steps of cutting a nonwoven fabric sheet to form a piece for the liner, which piece has outer periphery and an inner periphery for efining the central opening and is separably fitted in the nonwoven fabric sheet, separating the piece for the liner from the sheet, placing the separated piece at a prescribed position so as to be correctly positioned to the prescribed position, cutting the piece to form a window thereby finishing a liner formation, and holding the piece and transferring the finished liner to the shell to place it thereon by a transfer head.

An apparatus for carrying out the process comprises a cutting machine for cutting a nonwoven fabric sheet by pressing a cutting blade on the sheet on an anvil to form an annular piece for the liner, which piece is cut separably but fitted in the sheet, a conveyor for conveying the sheet which has the annular piece fitted therein, a separation device for separating the annular piece from the sheet, a positioning member for positioning the annular piece at a prescribed position, a cutting device for cutting the annular piece at the prescribed position to form the window therein thereby providing a finished liner, and a transfer head for holding the liner at the prescribed position and transferring to the shell.

24 Claims, 5 Drawing Sheets

PROCESS AND APPARATUS FOR PRODUCING MAGNETIC DISKETTE

BACKGROUND OF THE INVENTION

The present invention relates to a process and apparatus for producing magnetic diskette and, more particularly, to a process of and apparatus for producing liners provided in a magnetic diskette such as floppy disc for cleaning the surfaces of the disc and placing the liner on a shell at a desired position thereof.

In general, a magnetic diskette comprises a shell composed of upper and lower half, a magnetic disc sheet placed between the shell halves and liners each welded on the shell half.

The liners are composed of a nonwoven fabric sheet and this sheet has the liner form cut, these are used for cleaning the magnetic disc sheet and for preventing the disc sheet surface from debris, etc.

Various methods and apparatus for producing magnetic diskette including such liners, particularly, processes and apparatus for production of such liners and for assembling the liners into the shells have been proposed Some examples of the prior arts are as follows Japanese Patent Laid-Open No. 61-14895 (1986) discloses a liner production method in which a nonwoven fabric sheet is cut by a device of die and punch to form a disc-like piece, the disk-like piece is transferred to another cutting machine and cut them from a central opening thereby to form a ring-like liner. The liner is welded to a shell. This method uses the die and punch.

The die and the punch are necessary to provide a small gap between the die and punch. Since the nonwoven fabric sheet has very fine fibers therein, so that the gap has to be very small. Therefore it is difficult to cut the sheet without leaving any fibers uncut.

Japanese Patent Laid-Open No. 62-129987 (1987) discloses a method of cutting a nonwoven fabric sheet into a liner. According to the method, the sheet is disposed on a film of synthetic resin which can be melted with heat and has a lower melting point than that of the liner sheet, and heat is applied to the sheet and film along a cutting line to melt the resin and fix the fabric sheet with the melted resin, and then the sheet is press-cut by a means of a die and punch along the melted resin portion, so that the fabric sheet can be cut without defibering or without leaving any fibers uncut. This process is complicated.

Japanese Patent Laid-Open No. 61-162873 (1986) discloses a process of forming liners and assembling the liners into half cartridges. In the process, a series of half-production liners band in which partial outer peripheries of the liners and central openings are shaped is formed from a nonwoven fabric sheet, and then the band is cut to form openings for magnetic heads and separate by cutting between adjacent liners.

The cut-off individual liner is transferred on the half cartridge by a transfer device and fixed thereto. The process and apparatus for carrying out the process are complicated.

Japanese Patent Laid-Open No. 61-278094 (1986) discloses an assembling apparatus for magnetic disc cartridges. The apparatus includes liner production apparatus wherein a nonwoven sheet is cut into a final liner profile with a die roller and an anvil roller, the cut liner is sucked on the anvil roller, transferred to a cartridge casing by a robot and then spot-welded thereto for preliminary fixing. The complete profile of the liner has intersections of a straight line and another straight line, or of a straight line and a curved line. Upon the cutting, at such intersections, uncut fibers of a nonwoven fabric sheet for the liner are likely to be left. Further in case that the liner formed by the cutter roller and the anvil roller is directly transferred to the shell, it is difficult to place the liner on the shell at a correct position, because the nonwoven fabric sheet for liners is very soft and easy to deform so that a distance between the cutting position and a transfer position, for example, is not constant and a relative position of the transfer head and the liner held by the transfer head is not constant.

Japanese Patent Laid-Open No. 61-188879 (1986) is similar to the above Laid-Open and further including, before cutting the sheet into a liner, a heat seal step for forming heat seal portion along the configuration of the liner. The heat seal can be carried out pressing a heat seal roll on the nonwoven fabric sheet on an anvil roller. The liner which the heat seal is effected does not disperse dusts from cut edge portions of the liner.

Japanese Patent Laid-Open No. 62-152696 (1987) discloses a method of production of liners. According to the method, two nonwoven fabric sheets are put on each other. The piled sheets are cut to form a series of semi-production liners each having central opening and an outer periphery formed by 4 slits and the sheets are separated. Each sheet is cut into an individual liner, and then the liner is cut to form a window opening for magnetic head. This process also is complicated.

SUMMARY OF THE INVENTION

An object of the invention is to provide a process and apparatus for producing a magnetic diskette, which are simple and easy to set a liner cut out from a nonwoven fabric sheet on a shell of the magnetic diskette at a correct position in a correct form.

Another object of the invention is to provide a process and apparatus for producing a magnetic diskette, which are able to cut a nonwoven fabric sheet into liners without leaving any uncut fibers, to place the liners on shells in a prescribed form without deformation thereof and to produce magnetic diskette at a high speed.

An aspect of the present invention resides in a process of producing a magnetic diskette comprising a pair of halves forming a shell, a magnetic disc sheet inserted rotatably in the shell and liners fixed to the shell halves, respectively, and positioned on the sides of the magnetic disc sheet for cleaning the sheet, each of the liners having an outer periphery, a central opening and a window for a head. The process comprises the steps of cutting a nonwoven fabric sheet to form a piece for the liner, which piece has the outer periphery and an inner periphery for defining the central opening and is separably fitted in the nonwoven fabric sheet, separating the piece for the liner from the sheet, placing the separated piece at a prescribed position so as to be correctly positioned to the prescribed position, cutting the piece to form a window thereby finishing a liner formation, and holding transferring the finished liner to the shell to place it thereon by a transfer head.

According to the process, positioning of the piece for liner cut from the nonwoven fabric sheet is effected on the transfer way from the nonwoven fabric sheet to the shell to obtain a correct positional relation between the liner and the transfer head, so that the liner can be placed at a required position of the shell. Therefore, it is not necessary to provide any guide for the liner in the shell, and the liner can be assembled into the shell at a high speed.

According to another feature of the present invention, the window is formed under the condition that the annular piece is pressed or held by the transfer head for conveying the liner to the shell. This process can provide a correct positional relation of the window to the shell.

Further another feature of the present invention is characterized in that in the step of cutting the nonwoven fabric sheet, two cuts are provided in the fabric sheet by pressing a cutting blade on the sheet on an anvil, one of which is for the outer periphery along a circular line and the other is for forming a central opening along a circular line. These cuts do not include any intersections crossing two or more lines so that the nonwoven fabric sheet can be cut without leaving any uncut fibers.

Further another feature of the present invention is characterized in that in the step of forming the window in the liner piece, the liner piece is cut along two lines spanning the outer periphery and the inner periphery by two pairs of gapless cutters, an example of the cutters is scissors.

Another aspect of the present invention reside in apparatus for producing a magnetic diskette comprising a pair of halves forming a shell, a magnetic disc sheet placed rotatably in the shell and liners fixed to the shell halves, respectively and positioned on the sides of the magnetic disc sheet for cleaning the sheet, each of the liners having an outer periphery, a central opening and a window for a head.

The apparatus comprises a cutting machine for a nonwoven fabric sheet by pressing a cutting blade on the sheet on an anvil to form an annular piece for the liner, which piece is cut separably but fitted in the sheet, a conveyor for conveying the sheet which has the annular piece fitted therein, a separation device for separating the annular piece from the sheet, a positioning member for positioning the annular piece at a prescribed position, a cutting device for cutting the annular piece at the prescribed position to form the window therein thereby providing a finished liner, and a transfer head for holding the liner at the prescribed position and transferring to the shell.

The cutting machine for cutting the nonwoven fabric liner is preferable to be a pair of rollers one of which is a cutting roller having two circular edges on a cylindrical surface thereof and the other is an anvil roller having finished cylindrical roller. These rollers can cut the nonwoven fabric sheet into annular piece for the liner which piece is separable from the sheet and fitted in the fabric sheet with its elasticity. According to this cutting method, the sheet can be cut without leaving any uncut portion or fibers included in the fabric sheet. The cutting blade of the cutting roller has no sharply changing portion such as an intersection of a straight line and a straight line (or of a straight line and a curved line) so that it can cut the sheet well for a long time.

Further in the formation of the window in the liner, a gapless cutter such as scissors can be employed so that the fabric material can be cut without uncut fibers.

Still further, the transfer head is used for holding the annular piece for the liner at the time of formation of the window and for transferring the liner to the shell, so that the liner can be positioned correctly to the shell.

DESCRIPTION OF THE INVENTION

Figure 1:
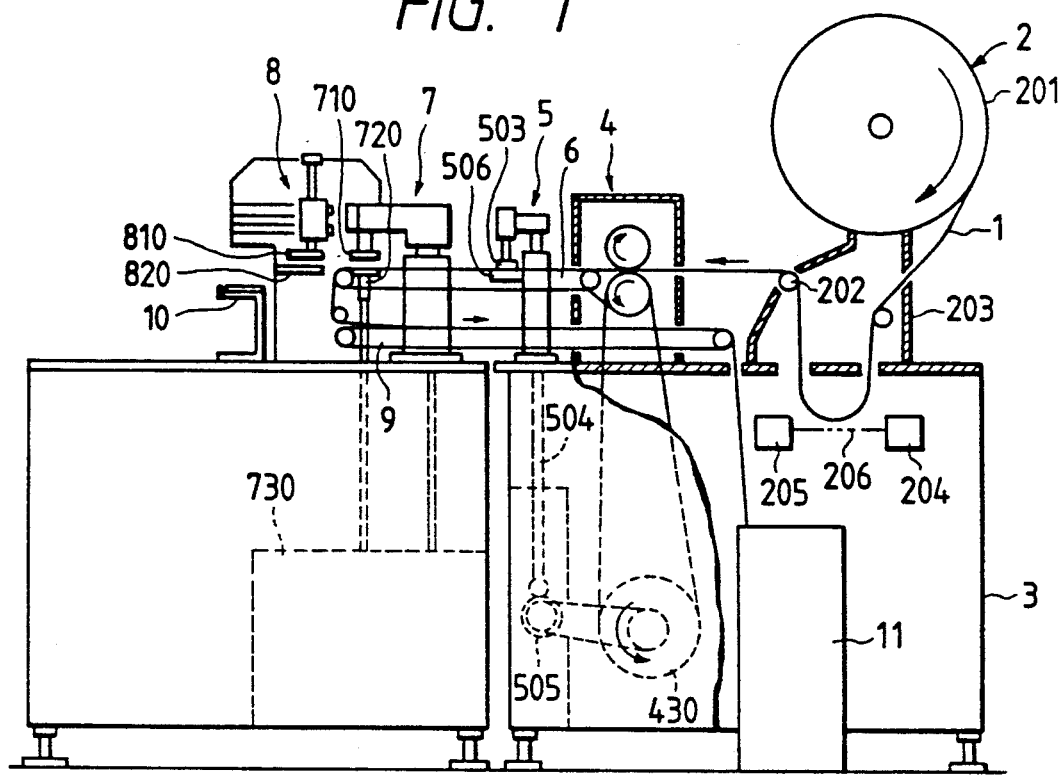
FIG. 1 is a sectional view of apparatus for producing a magnetic diskette of an embodiment of the present invention.

An embodiment of the present invention will be described hereunder in detail referring to the drawings.

First of all, an example of a magnetic disc, a floppy disc, will be described referring to FIG. 10.

Figure 10:
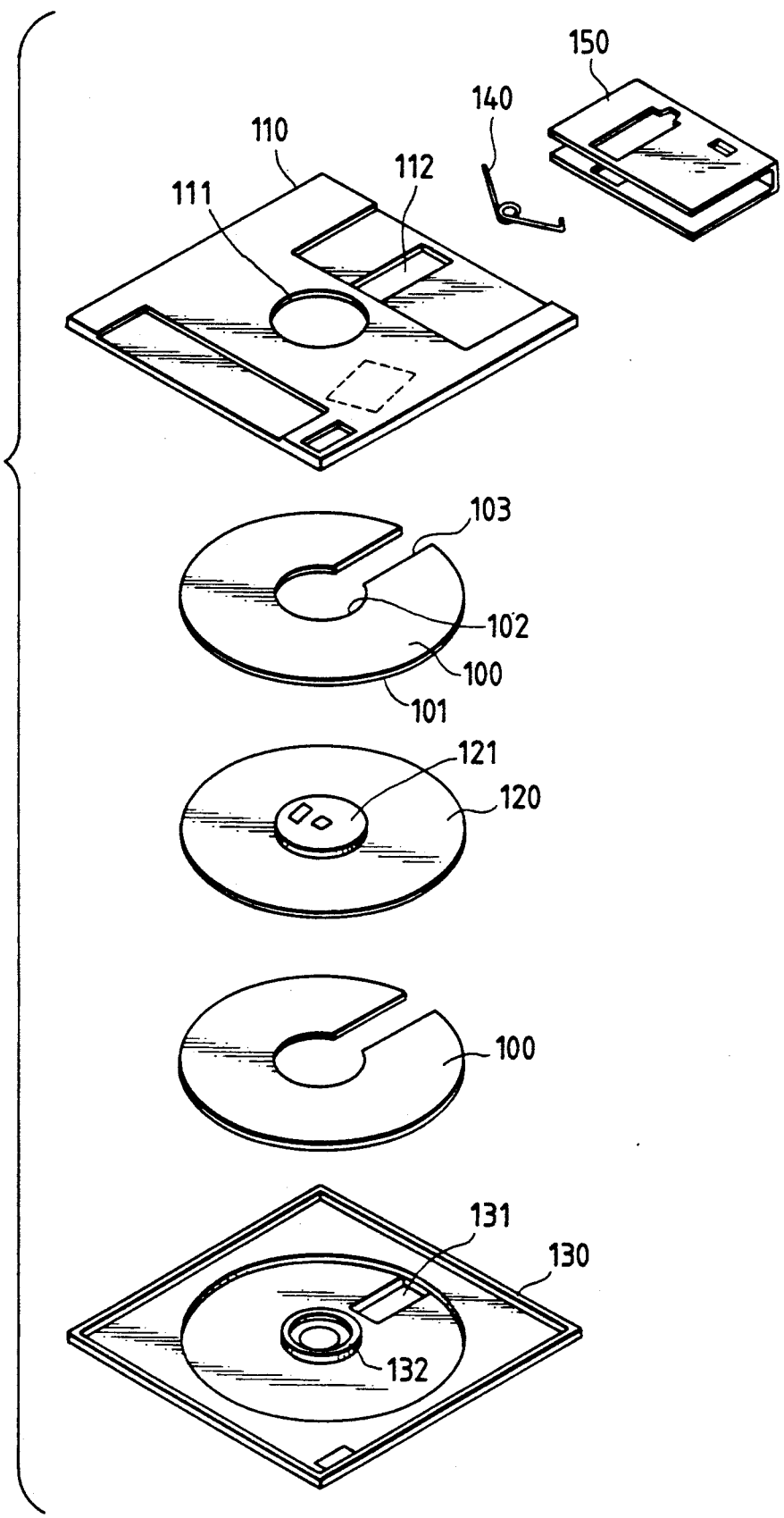
FIG. 10 is a perspective view showing disassembled components of a floppy disc.

FIG. 10 shows a perspective view of disassembled parts of the floppy disc.

In FIG. 10, a magnetic disc sheet 120 which has a center core 121 for engagement with a disc driver is placed in a shell to be rotatable therein. The shell comprises a lower half 110 and an upper half 130. The lower half has a central opening 111 for the center core 121 of the disc sheet 120 and a window 112 for a magnetic drive head. The upper half 130 has a central boss 132 guided in the center core 121 with a play and a window 131 for the magnetic head. A liner 100 is composed of nonwoven fabric, and has a central opening 102 for the center core of the disc 120 and a window 103 or a cutout portion for the magnetic drive head. The liners 100 are welded to the inside of the upper and lower half 130, 110, respectively. The liner 100 welded to the lower half 110 is partially lifted by a wiper spring so that the liner is in contact with the disc sheet. Thus formed upper and lower half 130 and 110 are assembled together so that the disc sheet 120 is sandwiched therebetween.

A shutter 150 is assembled together with a spring 140 onto the shell for shutting the window for the magnetic drive head.

In operation, when the disc sheet 120 is rotated the liners 100 in contact with the disc sheet 120 clean the sides of the disc sheet 120. Since the liners are very soft and rough, the disc sheet is cleaned and prevented from debris.

The present invention, particularly, is concerned with the production of such liners of nonwoven fabric and assembling of the liners to the shells.

The liner has an outer periphery 101, an inner periphery 102 for defining a central opening and a window 103 for the magnetic drive head.

The type and shape of the liner should not be limited to the above-mentioned example.

Liners such as mentioned above are mainly for cleaning the surfaces of the disc sheet.

The liners are composed of nonwoven fabric of thermoplastic synthetic resin such as rayon, polypropylene, polyester, etc. The nonwoven fabric is made into a sheet which has relatively a narrow width and a relatively long length.

Next, an embodiment of a production method and apparatus for magnetic diskette of the present invention is described hereunder in detail referring to FIGS. 1 to 7.

Figure 2:
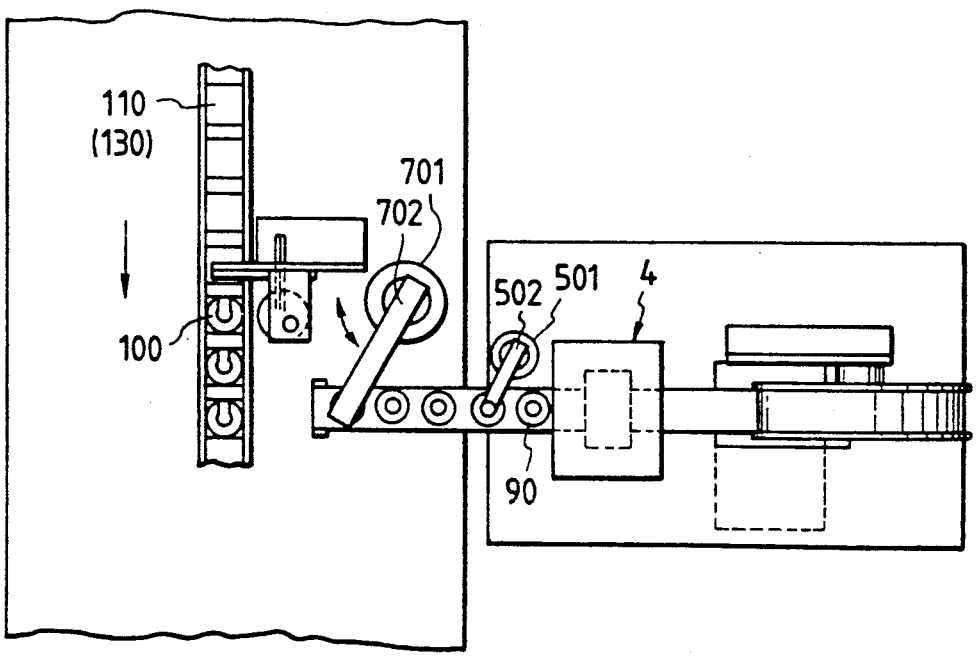
FIG. 2 is a plane view of the apparatus shown in FIG. 1.

In FIGS. 1 and 2, the production apparatus comprises a feeder 2 for a nonwoven fabric sheet 1, a cutting machine 4 for cutting the sheet 1 to form annular liner pieces 90 in a fashion that the cut liner pieces are separable from but fitted in the sheet 1, a conveyor 6 for horizontally transferring the sheet in which the cut liner pieces are fitted, a separation device 5 for pushing a central cut portion 91 (see FIG. 3) of the sheet 1 to form a central opening of the liner 100, a separation and transfer device 7 for separating the liner piece 90 from the sheet 1 and transferring the separated liner piece 90 to a window opening forming position at which a window for magnetic drive head is formed, and a cutting and transfer device for shearing the liner piece 90 to form a final shape of the liner 100 and transferring the liner 100 to place on a shell half 110 or 130 on a conveyor 10.

The feeder 2 is provided with a reel 201 on which the sheet 1 is wound, a supporter 203 supporting the reel 201 on a machine chamber 3, idle rollers 202 rotatably supported by the supporter 203, and a photoelectric sensor 204 and a light source 205. The sheet 1 between the idle rollers 202 is hung, when a hung portion of the sheet 1 interrupts light 206 from the light source 205, the reel 201 is not moved to rotate and when the photoelectric sensor 204 receives the light 206, the reel 201 is rotated for a time by a motor (not shown) whereby a necessary amount of the sheet 1 is fed to the cutting machine 4.

Figure 3:
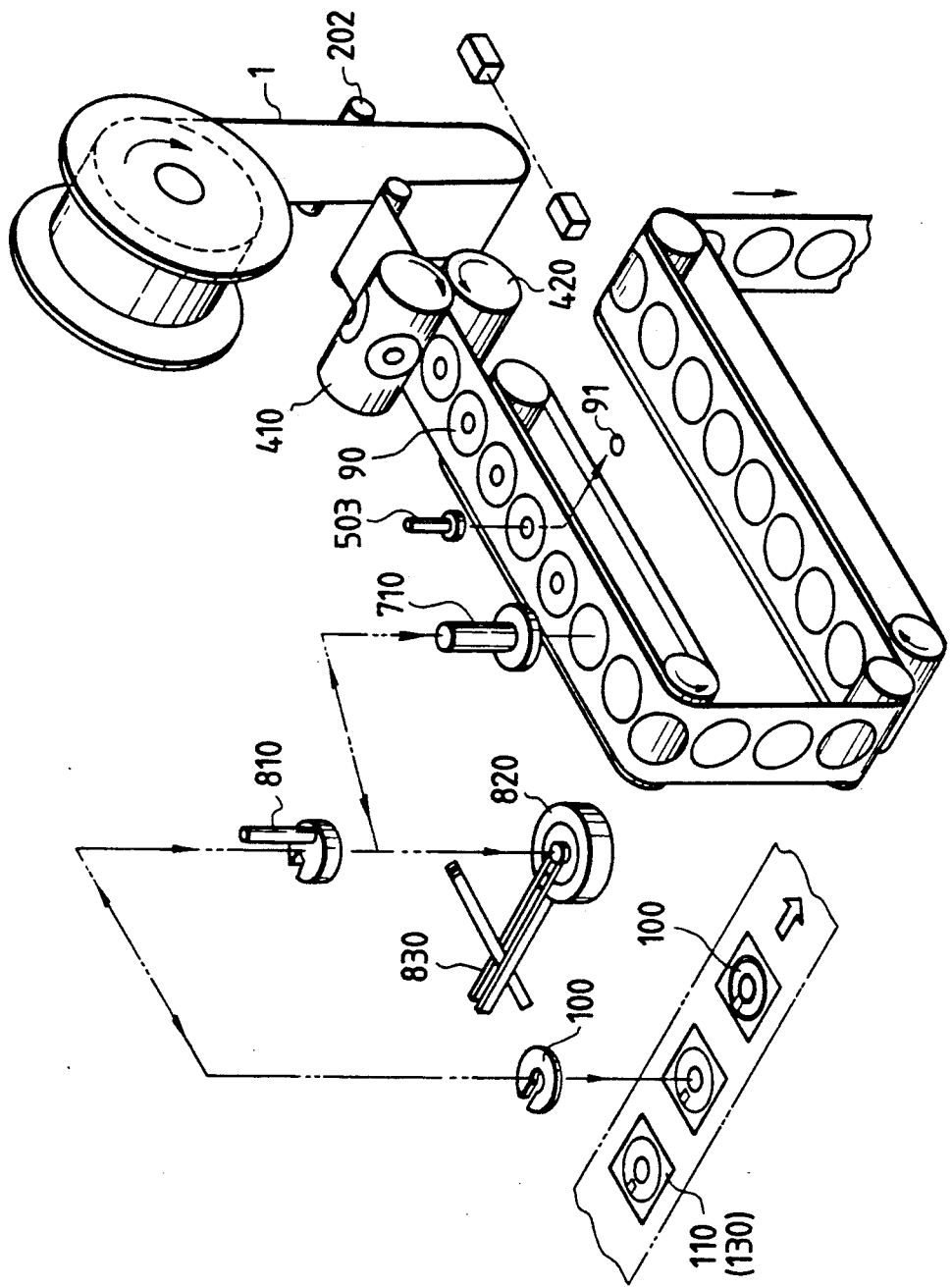
FIG. 3 is a schematic diagram for explaining the apparatus and its functions.
Figure 4:
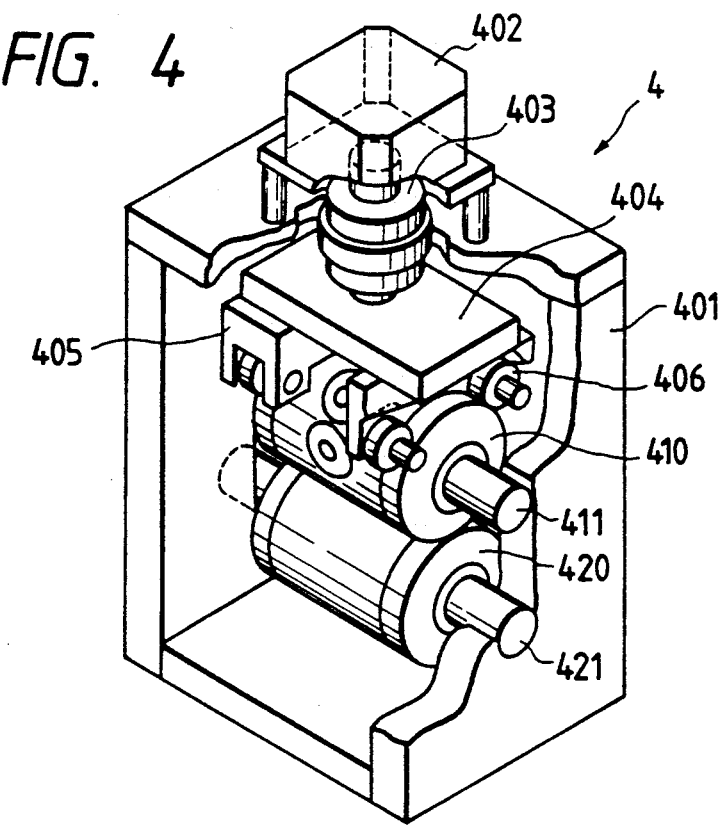
FIG. 4 is a perspective view of a part of the apparatus of FIGS. 1 and 2, a cutting device.

The cutting machine 4 is constructed as shown in FIG. 4. An air cylinder 402 is mounted on an upper plate of a housing 401 for producing a pressing force An output shaft of the air cylinder 402 is coupled with a flexible coupling 403. The coupling 403 is engaged with a pressing plate 404 so that the pressing plate 404 can receive the pressing force from the air cylinder 402. The pressing plate 404 is engaged with a cutting or die roller 410 through a pair of roller holders 405 each having a pair of rollers 406 in contact with the die roller 410. The die roller 410 has cutting blade each slightly projecting from a cylindrical surface of the die roller 410. One of the cutting blade is for cutting an outer periphery 101 of the liner 100 and the other is for the inner periphery 102 for the central opening of the liner. As seen in FIGS. 3 and 4, the cutting blades for respectively cutting the outer and inner peripheries are circular only, and have no sharply changing portion (such as where the blade changes from a circular portion to a straight line; i.e., the blade does not include an intersection of a circle and a straight line, e.g., to cut out the window); accordingly, as discussed previously, the cutting blade of the cutting roller can cut the sheet 1 well for a long time. The die roller 410 is rolled with an anvil roller 420 having a cylindrical surface finely finished. When the sheet 1 is rolled through between the die roller 410 and the anvil roller 420, the sheet 1 is pressed on the anvil roller 420 by the cutting blade of the die roller 410 and cut in a liner without separating the cut liner from the sheet 1. The die roller 410 and the anvil roller 420 are engaged with each other through gears (not shown) fixed to shafts 411 and 421 and rotational motion of the two rollers are synchronized so that the peripheral speed of the die roller 410 and the anvil roller 420 are equal to each other The die and anvil rollers 410, 420 are driven by indexer (not shown) in a driving device 430 disposed in the machine chamber 3 through a drive belt such as a timing belt.

The air cylinder 402 can control the pressing force according to the thickness, the property of the liner sheet material.

The conveyer 6 is of a type employing two belts arranged in parallel to each other with a distance therebetween. The conveyer 6 is disposed at n output side of the cutting machine 4 and moved intermittently to be in synchronism with a feed speed of the die and anvil rollers 410 and 420.

The separation device 5 comprises a pushing head 503 having an outer diameter a little smaller than that of the central opening of the liner, a drive body 501 connected to the pushing head 503 through an arm 502 and driving the pushing head upward and downward with help of a cam mechanism comprising a cam rod 504 and a cam 505 driven by the driving device 430, and a support table 506 disposed between the belts of the conveyor 6 and supporting the sheet 1. The support table 506 has an opening whose diameter is slightly larger than the diameter of the central opening of the liner, so that when the separation head is moved downward, only central part 91 of the cut liner piece 90 is separated away to be exhausted downward as shown in FIG. 3. The separation is effected at the time of stopping of the movement of the conveyor 6.

The separation and transfer device 7 comprises a transfer head 710 a drive section 730 for actuating the transfer head 710, a pushing head 720 and a stationary plate 721. As shown in FIGS. 5a to 5d, the transfer head 710 comprises a suction head 711 having a plurality of suction ports and a ring 712. The ring 712 is connected to the suction head 711 by a spring (not shown) so that the lower surfaces of the suction head 711 and the ring 712 have the same level. The pushing head 720 is inserted in an opening of the stationary plate 721 which has the same level as an upper surface of the conveyor 6. The ring 712 and the stationary plate 721 each have a inner diameter slightly larger than that of the outer periphery of the liner piece 90, and the transfer head 710 and the pushing head 720 each have an outer diameter slightly smaller than that of the outer periphery of the liner piece 90 or liner 100.

The pushing head 720 and the stationary plate 721 are disposed at the same level as the upper surface of the conveyor 6.

Figure 5A:
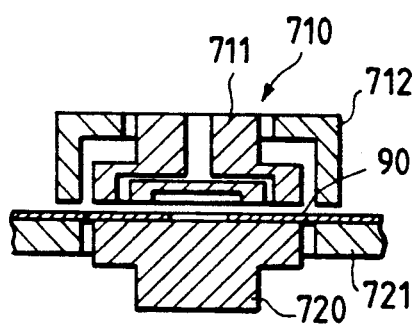
FIGS. 5a to 5d each are a sectional view of a transfer head and a pushing head used in the apparatus shown in FIGS. 1 and 2, for explaining separation of a liner.
Figure 5B:
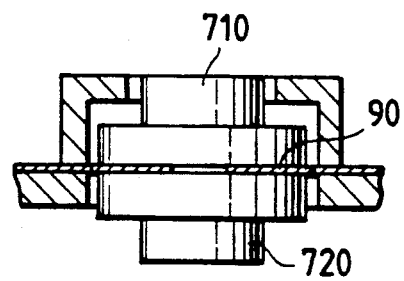
Figure 5C:
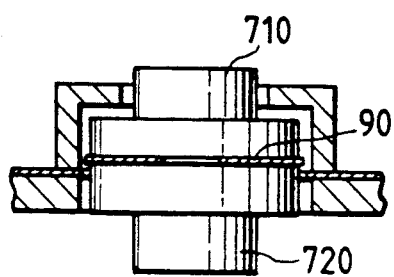
Figure 5D:
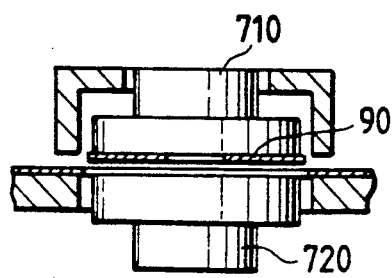

In separation of the liner piece 90 from the sheet 1, the transfer head 710 goes downward and firmly holds the sheet 1 by the transfer head 710, the pushing head 720 and the stationary plate 721 at the level of travelling of the sheet 1 as shown in FIG. 5b. Under this condition, the pushing head 720 pushes up the suction 5 head 711 as shown in FIG. 5c as the ring 712 and the stationary plate 721 are left unchanged in their positions, then the pushing head 720 and the transfer head 710 are returned at the original position as shown in FIG. 5d. The suction ports are communicated with a vacuum source (not shown) while the sheet 1 is held. The liner piece sucked by the transfer head 710 is transferred to the cutting and transfer device 8 through rotation and vertical movement of the transfer head 710, as shown in FIG. 3.

Figure 6:
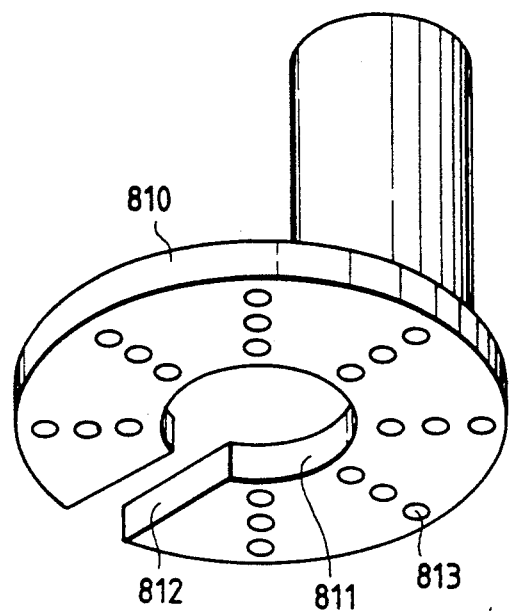
FIG. 6 is a perspective view of a transfer head used in the apparatus.
Figure 7:
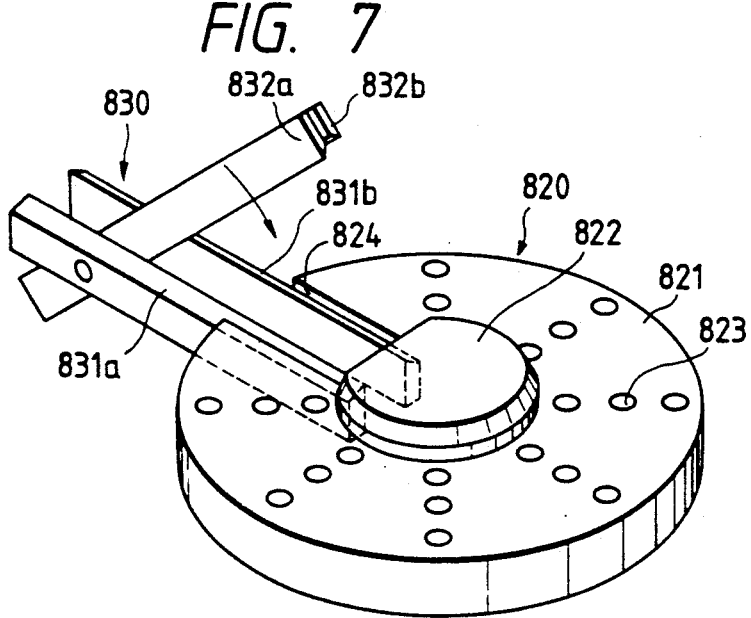
FIG. 7 is a perspective view of a cutting and positioning device of the apparatus shown in FIGS. 1 and 2.

As shown in FIGS. 6 and 7, the cutting and transfer device 8 comprises a disc-like table 821 having a plurality of suction ports 823 and a cut-out portion 824 for scissors, a positioning pin or boss 822 provided at a center of the table 821, two pairs of scissors (831a, 832a; 831b, 832b) mounted in the cut-out portion 824, and a transfer head 810. The transfer head 810 has a disk provided with a plurality of suction ports 813 (several tens ports), a central opening 811 and a cut-out portion 812.

The disk-like table 821 and the positioning boss 822 constitute a positioning device.

The positioning boss 822 has an outer diameter 0.1 mm to 0.5 mm smaller than the inner diameter of the central opening of the liner piece and has a tapered top inclined at 30° to 45° to a vertical line for guiding the liner piece to fit in, whereby the liner piece can be easily fitted to the positioning boss.

The liner piece 90, which is separated from the sheet 1 as shown in FIG. 5d, is transferred over the table 821 and then lowered to be mounted thereon so that the central opening will be fitted to the positioning boss 822. When the transfer head 710 comes near to the positioning boss 822, the vacuum applied to the transfer head 710 is relieved and returned to the original position as shown in FIG. 5a, and the table 821 is supplied with vacuum to tightly hold the liner piece 90 whereby the position of the liner piece 90 is determined by the positioning boss 822. Air jet application to the upper side of the liner piece helps to fitting of the liner piece to the positioning boss 822.

The transfer head 810 descends to press the liner on the table 821. The cut-out portion 812 of the transfer head 10 is disposed at the same position of the cut-out portion 824 of the table 821. Under the condition that the liner is firmly held by the table 821 and transfer head 810, a window of the liner for magnetic drive head is cut off by the two pairs of scissors. That is, the liner pieces 90 is cut along two lines spanning the outer periphery and the inner periphery of the liner piece whereby the liner is finished. The scissors each have an edge of an angle less than 90° and a pair of the scissors are pressed by each other so that the liner can be cut with no gap between the cutting blades, therefore, any fine fibers can be cut off completely.

The liner is transferred to the shell on the conveyor by the transfer head 810 with vacuum being applied to the suction ports 813. The liner is disposed on the shell so that the window of the liner for the magnetic drive head corresponds to the window of the shell for magnetic drive head. And then the liner 100 is welded to the shell 110 or 130. The shell 110 or 130 is not necessary to be provided with any projections or recesses for positioning the liner 100 because the transfer head 810 positions the liner 100 on the shell 110 or 130 at a desired position.

A positional relation of the liner piece separated from the sheets to the transfer head 710 of the separation and the transfer device 7 is not constant because the position of the liner piece 90 fitted in the sheet 1 at the separation and the transfer device 7 is not constant due to soft and flexible material property of the sheet 1. The positional relation is corrected by placing the liner piece on the positioning boss and then holding the liner or liner piece by the transfer head 810 so that the positional position of the liner piece to the transfer head 810 is constant. Therefore, the transfer head 810 can move to any desired positions.

A waste sheet 1 is transferred to a waste box 11 by a conveyor 9.

Figure 8:
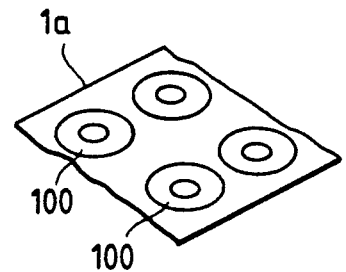
FIGS. 8 and 9 each are a perspective view of a part of a nonwoven fabric sheet in which two rows of annular pieces for liner are cut and fitted therein.
Figure 9:
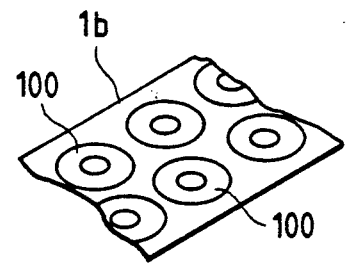

As shown FIGS. 8 and 9, two rows of liner pieces can be cut at the same time by using a die roller having two rows of cutting blades and an anvil roller corresponding to the two row die roller. The die and anvil rollers can improve the production speed of the liners further.

What is claimed is:

1. A process of producing a magnetic diskette comprising a pair of halves forming a shell, a magnetic disc sheet placed in the shell and liners disposed between the magnetic disc sheet and the shell, said liners each having an outer periphery, an inner periphery for a central opening and a window for a head, said process comprising the steps of:

cutting a nonwoven fabric sheet to form a piece for the liner, the piece having the outer periphery and the inner periphery and being separable from but fitted in the sheet;

separating the piece from the sheet;

transferring the separated piece to a positioning device to fix a positional relation of the separated piece to the positioning device;

cutting the separated piece at the positioning device to form the window, thereby to provide a finished liner; and holding the separated piece at the positioning device by a transfer head, and transferring the finished liner, through moving the transfer head, to the shell, to place the liner on a predetermined position of the shell.

2. A process of producing a magnetic diskette according to claim 1, wherein in said step of cutting the nonwoven fabric sheet, the nonwoven fabric sheet is cut so as to form an annular piece by passing the sheet between a cutting blade and an anvil, and pressing the sheet on the anvil by the cutting blade.

3. A process of producing a magnetic diskette according to claim 2, wherein the annular piece is transferred to the positioning device such that a positioning member of the positioning device is inserted in a central hole of the annular piece, and the annular piece is held by the transfer head before forming the window, whereby a relative position of the annular piece to the transfer head is determined.

4. A process of producing a magnetic diskette according to claim 3, wherein said window is formed by cutting the annular piece with two pair of scissors along lines spanning the outer periphery and the inner periphery of the annular piece.

5. A process of producing a magnetic diskette according to claim 4, wherein the step of holding the annular piece by a first transfer head, and the separating step, are effected while feeding of the sheet is stopped.

6. A process of producing a magnetic diskette according to claim 1, wherein the nonwoven fabric sheet is made of a thermoplastic synthetic resin.

7. A process of producing a magnetic diskette according to claim 1, wherein in the step of cutting the nonwoven fabric sheet to form said piece, a cutting blade for forming the piece respectively has a first, inner configuration and a second, outer configuration surrounding the first, inner configuration, so as to respectively form the inner periphery and the outer periphery of the piece.

8. A process of producing a magnetic diskette according to claim 7, wherein the first, inner configuration is a same shape but a different size than the second, outer configuration.

9. A process of producing a magnetic diskette according to claim 8, wherein both the first, inner configuration and the second, outer configuration are circular.

10. A process of producing a magnetic diskette according to claim 8, wherein the piece is cut at the positioning device, to provide the finished liner, using substantially straight cutting blades spinning from the outer periphery to the inner periphery of the piece.

11. A process of producing a magnetic diskette according to claim 1, wherein each separated piece is individually transferred to the positioning device.

12. A process of producing a magnetic diskette comprising a pair of halves forming a shell, a magnetic disk sheet placed in the shell and a pair of liners adhered to the shell halves, respectively, and disposed on both sides of the magnetic disc sheet, said liners each having an outer periphery and a central opening and a window for a head, said process comprising the steps of:
   cutting a nonwoven fabric sheet by passing said nonwoven fabric sheet between a die roller and an anvil roller to form individual annular pieces for each liner, each annular piece being cut at the outer periphery and at an inner periphery for the central opening, and separable from but fitted in the sheet;
   transferring the sheet, having each annular piece fitted therein, by a conveyor moving intermittently in a horizontal direction;
   separating a central part cut at the inner periphery and fitted in the sheet, from the sheet, during stoppage of the movement of the conveyor by pushing down the central part, thereby forming the central opening;
   separating, during stoppage of the conveyor, one of the annular pieces from the sheet by holding the annular piece between a first transfer head and a disk member and then moving the annular piece vertically while being held by the first transfer head and the disk member;
   transferring the annular piece to a cutting position by the first transfer head, and releasing the annular piece from the first transfer head so that a fixed pin is inserted in the central opening, whereby the annular piece is positioned at a predetermined position of the fixed pin;
   holding the annular piece by a second transfer head and cutting the annular piece to form the window, whereby a finished liner is formed; and
   transferring the finished liner by the second transfer head to place the finished liner on a shell half.

13. A process of producing a magnetic diskette according to claim 12, wherein in said step of separating the annular piece from the sheet, the annular piece is held by flat faces of said first transfer head and the disc member so as to be flat, and said first transfer head sucks the annular piece by force of vacuum to adhere the annular piece on the flat face of said first transfer head.

14. A process of producing a magnetic diskette according to claim 12, wherein in said step of separating the annular piece from the sheet, the annular piece is separated under a condition that the sheet around the annular piece is held.

15. A process of producing a magnetic diskette according to claim 12, wherein each separated annular piece is individually transfered to the cutting position.

16. A process of producing a magnetic diskette comprising a pair of halves forming a shell, a magnetic disk sheet placed in the shell and liners disposed between the magnetic disc sheet and the shell, said liners each having an outer periphery, an inner periphery for a central opening and a window for a head, said process comprising the steps of:
   cutting a nonwoven fabric sheet to form a piece for the liner, the piece having the outer periphery and the inner periphery and being separable from but fitted in the sheet, the piece not having the window formed therein;
   separating the piece from the sheet;
   transferring the separated piece to a window forming position where the window is formed in the piece;
   cutting the separated piece at the window forming position to form the window, thereby providing a finished liner; and
   transferring the finished liner from the window forming position to the shell to place the finished liner on a predetermined position of the shell.

17. A process of producing a magnetic diskette according to claim 16, wherein the step of cutting the nonwoven fabric sheet to form the piece includes pressing a cutting blade on the sheet while the sheet is backed by an anvil, the cutting blade having a first cutting portion for forming the inner periphery and a second cutting portion for forming the outer periphery.

18. A process of producing a magnetic diskette according to claim 17, wherein both the first cutting portion and the second cutting portion are circular.

19. A process of producing a magnetic diskette according to claim 18, wherein, in cutting the piece at the window forming position, the piece is cut along two lines spanning the outer periphery and the inner periphery, so as to form the window.

20. A process of producing a magnetic diskette according to claim 19, wherein the piece is cut along the two lines, so as to form the window, with two pair of scissors.

21. A process of producing a magnetic diskette according to claim 16, wherein in the step of cutting the nonwoven fabric sheet to form said piece, a cutting blade for forming the piece respectively has a first, inner configuration and a second, outer configuration surrounding the first, inner configuration, so as to respectively form the inner periphery and the outer periphery of the piece.

22. A process of producing a magnetic diskette according to claim 21, wherein the first, inner configuration is a same shape but a different size than the second, outer configuration.

23. A process of producing a magnetic diskette according to claim 22, wherein the piece is cut at the window forming position, to provide the finished liner, using substantially straight cutting blades spanning from the outer periphery to the inner periphery of the piece.

24. A process of producing a magnetic diskette comprising a pair of halves forming a shell, a magnetic disc sheet placed in the shell and a pair of liners welded to the shell halves, respectively, and disposed on both sides of the magnetic disk sheet, said liners each having an outer periphery, an inner periphery so as to form a central opening, and a window for a head, said process comprising the steps of:
   cutting a nonwoven fabric sheet by feeding the sheet between a die roller and an anvil roller to form an annular piece for the liner, the annular piece being cut to form the outer and inner peripheries and being separable but fitted in the sheet;
   transferring the sheet having the annular piece fitted therein intermittently;

holding the annular piece by a first transfer head, separating the annular piece from the sheet and transferring the same to a positioning device under a condition that the annular piece is held by the first transfer head, the annular piece being held flat by the first transfer head;

releasing the annular piece held by the first transfer head to fit a positioning member of the positioning device into the central opening of the annular piece, the central opening being defined by the inner periphery;

holding the released annular piece by a second transfer head to fix a relative position of the piece to the second transfer head;

cutting the piece along two straight lines spanning the outer and inner peripheries of the annular piece to form a finished liner; and transferring the finished liner by the second transfer head to place the finished liner on the shell at a predetermined position.

* * * * *